Jan. 28, 1964     A. L. KRAFT     3,119,412
FLUID METERING MEANS
Filed Oct. 5, 1962     2 Sheets-Sheet 1
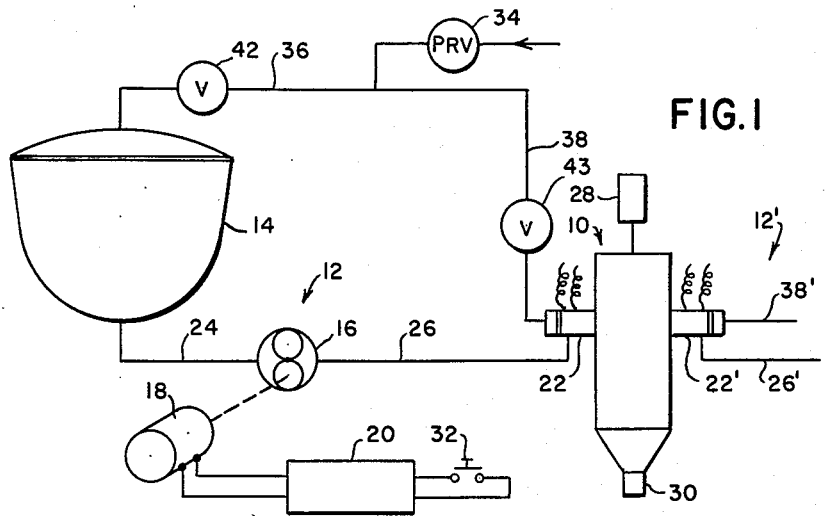
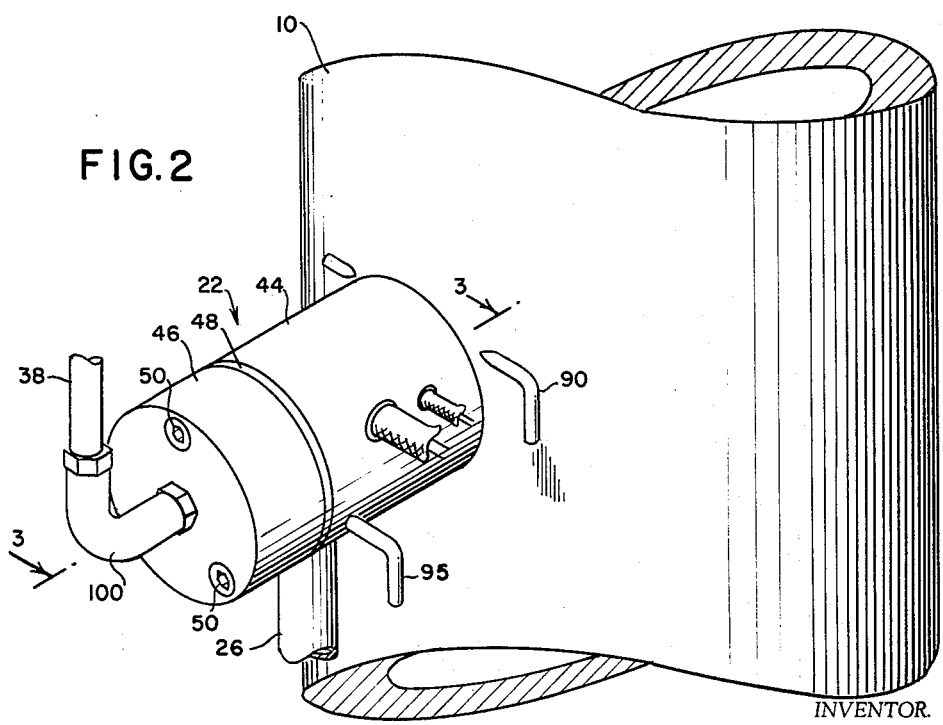
INVENTOR.
AUGUST L. KRAFT
BY
Adams, Forward and McLean
ATTORNEYS Jan. 28, 1964    A. L. KRAFT    3,119,412
FLUID METERING MEANS Filed Oct. 5, 1962    2 Sheets-Sheet 2

INVENTOR.
AUGUST L. KRAFT
BY
Adams, Forward and McLean
ATTORNEYS

United States Patent Office 3,119,412
Patented Jan. 28, 1964

3,119,412
FLUID METERING MEANS
August L. Kraft, Roselle Park, N.J., assignor to Automatic Process Control, Inc., Union, N.J., a corporation of New Jersey
Filed Oct. 5, 1962, Ser. No. 228,597
4 Claims. (Cl. 137—565)

My invention relates to metering of fluid materials and in particular provides a regulatory device and system for operation in conjunction with a positive displacement pump and having particular advantage in greatly reducing leakage through the pump, thus enhancing its accuracy when employed as a meter.

Present day chemical technology has brought widespread employment of multi-component liquid reaction systems in the preparation of synthetic materials such as epoxides, polyurethanes and polyesters for encapsulating components, casting articles, production of foams and the like. While in the beginning the reaction components, usually a resin and a hardener, e.g. a cross linking agent, were separately measured and then mixed as a batch. As the utilization of such materials advanced to commercial proportions, hand-mixing methods were replaced by machinery which permitted the automated, simultaneous measuring of the individual components followed by mixing and dispensing of such materials continuously, or intermittently as needed. The operation of such machinery has, to some extent, been an art, requiring the operator to change ratios of components as the operator noted changes in the mixed product, even though such machinery usually employed positive displacement meters which were mechanically coupled to insure proper maintenance of proportions of the metered components delivered to the mixer.

It should be understood that any machinery designed for the purpose of metering the individual components of a multi-component system must be designed to operate with materials having widely different characteristics in terms of viscosity, lubricity and temperature. As a fundamental mechanical consideration, since relatively low viscosity materials may be handled, meter clearances must be small. Since the material to be handled may also be a poor lubricant, in order that galling be avoided, relatively low metering rates and hence large volume meters should be anticipated. Normally the meters are driven and thus also function as pumps.

As a consequence of these factors leakage forward and backward through the pump is significant. For example, in an intermittently operated gear pump, having 0.0005 inch clearances and 0.0008 inch lash, with a 50 p.s.i. head on the suction side and metering dioctylphthalate maintained at 50±2 cps. a 5% error is experienced at 20 r.p.m., while an error of 2% is experienced at 80 r.p.m. Using kerosene (7.8 cps.) in the same arrangement leakage is so high no measurement of accuracy can reasonably be made.

It is a principal object of my present invention to provide a regulatory device system which will increase the accuracy of positive displacement pumps utilized as meters, fundamentally by approximating a zero pressure differential across the pump such that the meter is working only against friction and such that leakage is minimized.

Secondarily, it is a further object of my present invention to provide such a pressure regulator of simple construction which when incorporated in a meter and mixing system as described hereinafter has the advantages of making the system rapidly disconnectible, of avoiding plug-up of the component entrance into the mixer by reacted components, and of acting as a safety valve to relieve overpressure in the system.

In general, there have been several approaches to the problem of leakage in metering machinery. In one such approach a booster pump and a relief valve are provided on the suction side of the metering pump. In this arrangement the relief valve is adjusted to match the suction pressure with the discharge pressure of the metering pump. It has also been suggested to utilize a positive displacement pump as a meter in which the meter is braked or driven to provide a zero pressure differential across the meter, evidently for the purpose of improving its accuracy. In yet another arrangement the pressure head on the upstream side of the metering pump is controlled to follow the downstream pressure and hold the differential across the meter to a minimum. Such systems as have heretofore been proposed, however, generally suffer the disadvantage of lack of adaptability to the intermittent operation characteristic of a large number of multi-component resin systems employed at this time.

Fundamentally I have solved these problems by applying the pressure head on the upstream side of a pump to pilot a diaphragm valve on the downstream side of the pump with the area of the diaphragm exposed to the discharge pressure of the pump when the valve is open equal to the area exposed to the piloting pressure head. Preferably, when the valve is closed, the opening of the inlet side of the valve which is closed by the diaphragm is just less than the area of the diaphragm exposed to the piloting pressure head such that when closed, the valve has a small positive force tending to keep it closed. This is, however, readily overcome upon starting the pump in operation to lift the diaphragm thereby placing the area of the diaphragm exposed to the discharge side of the pump equal to the area exposed to the piloting head.

Preferably a gas is employed to pressure the reservoir of material to be metered through the pump, and it is such gas pressure that is applied to pilot the diaphragm valve on the discharge side of the pump. Preferably the valve is mounted on a mixer with an outlet passageway of relatively small cross-sectioned area directed into the mixer of the metered component such that the discharge is relatively rapid. Thus, as material is metered into the mixer, any reacted compontnts which might hang-up in the outlet of such passageway are flushed into the mixer.

Desirably the valve body can be heated independently of the mixer on which it is mounted to permit control of the feed line of the component being metered and discharged through such valve at one temperature, while the mixer may be controlled at an entirely different temperature. This has particular value where one component of the system to be mixed is normally solid and must be heated in order to maintain it fluent and pumpable, while the reaction need not be carried at such a high temperature and remaining components need not be heated for efficient metering and mixing.

For a more complete understanding of my present invention reference is made to the appended drawings in which:

FIGURE 1 is a schematic representation of a metering and mixing system for metering and delivering a component to a mixer where it is to be mixed with another similarly metered component with which it is to be reacted;

FIGURE 2 is an enlarged fragmentary view of a portion of the apparatus shown in FIGURE 1;

Figure 3:
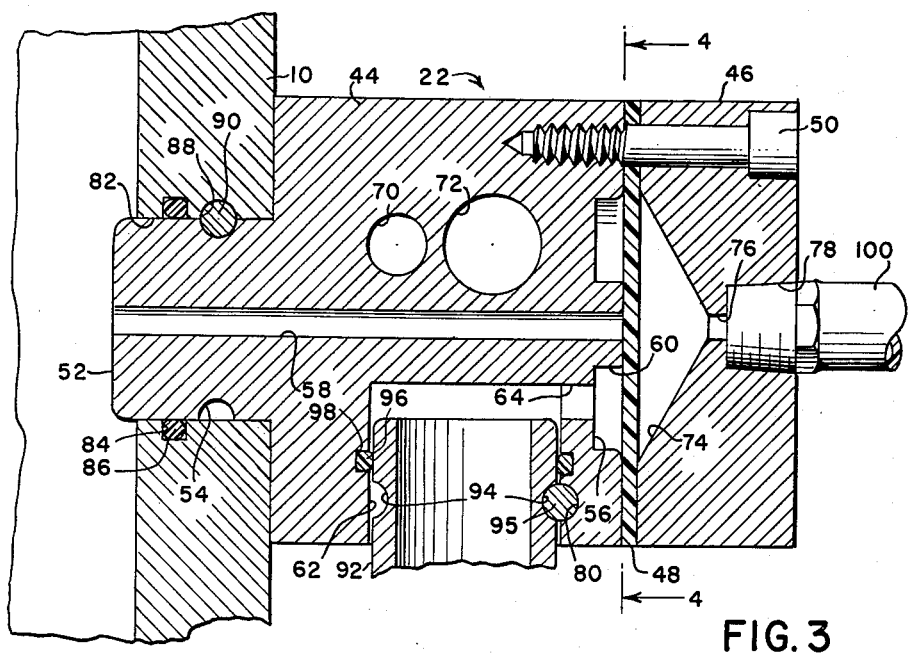
FIGURE 3 is a section taken along line 3—3 in FIGURE 2.

Referring more particularly to FIGURE 1 the reference numeral 10 designates a typical mixer for mixing a multicomponent resin system which is provided with a pair of almost identical component metering systems 12 and 12'.

Metering system 12 includes a closed kettle 14, a gear pump 16, a motor 18, a control circuit 20 and a regulator valve 22. Kettle 14 is connected at its bottom to a flexible hose 24 which is connected to the inlet connection on the suction side of pump 16, the outlet connection on the discharge side of pump 16 being connected by a flexible hose 26 to an inlet passageway on diaphragm valve 22, the outlet passageway of which is connected to the interior of mixer 10. Kettle 14 and hoses 24 and 26 can be provided with thermocouples and heating elements in a conventional manner to control the temperature of materials to be handled by feed system 12.

Typically mixer 10 is of small internal dimension and is provided with an agitator mounted vertically in mixer 10 and driven by a motor 28 mounted at the top of mixer 10. Desirably, mixer 10 is provided with a check valve 30, which is preferably air piloted, to prevent dripping during downtime.

Pump 16 is operable, when actuated, to transfer fluid from reservoir 14 through hose 24 into pump 16 and to discharge such fluid into hose 26 through which the fluid is passed through valve 22 into mixer 10. To accomplish this function motor 18 is connected to drive pump 16, and is controlled by control circuit 20. An actuating button 32 is connected to initiate operation of control circuit 20. In a typical operation, for example, in vacuum casting, control circuit 20, when initiated by button 32, normally will first connect a vacuum pump to evacuate an enclosure into which the discharge from mixer 10 is to be led and then will initiate operation of motor 18 to drive pump 16 for a period of time calculated to deliver the correct amount of ingredients. Thereafter circuit 20 will stop motor 18 and release the vacuum.

It will be understood that in the system described a similar pump 16' will be employed in the other component feed system 12' and that the two pumps in a conventional manner are mechanically connected together, typically through an interconnecting variable speed gearing. A single motor 18 is used to drive both pumps thus omitting any motor 18' or control circuit 20' in feed system 12'.

Insofar as I have discussed feed system 12 above, except for employment of regulator valve 22, the system and its connection with system 12' and mixer 10 are conventional. In accordance with my invention regulator valve 22 is mechanically piloted either with air, nitrogen or other gaseous fluid or, as will be discussed later, by a hydraulic fluid. The pressured gas is derived from a source, such as the discharge side of a pressure regulating valve 34 which is connected to a compressed air source. Valve 34 is connected through tubing 36 to the upper interior portion of kettle 14 and through tubing 38 to regulator valve 22. Preferably manually operable valves 42 and 43, which are normally open, are connected in tubing 36 and 38 respectively.

Figure 4:
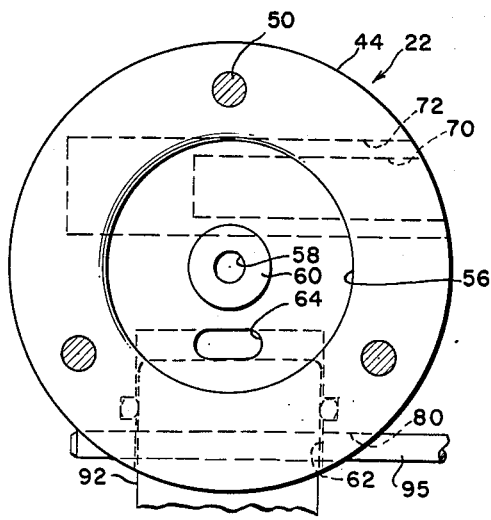
FIGURE 4 is a cross section taken at line 4—4 in FIGURE 3.

As can be seen more clearly referring to FIGURES 2, 3 and 4, valve 22 basically includes two cylindrical parts 44 and 46 which together define the hollow valve body. Valve 22 also includes a circular plate 48, i.e., a diaphragm of thin, resilient, material such as an acetal resin or a polymer of tetrafluoroethylene. Diaphragm 48 should be readily flexible but also tough and resilient. It will be noted that cylindrical pieces 44 and 46 have the same diameter and are bolted together in axial alignment by means of machine screws 50 which extend through the end of part 46 remote from part 44 into part 44 in which they are threadedly engaged, diaphragm 48 being interposed between parts 44 and 46 such that it is clamped between them.

Referring particularly to FIGURE 3 it will be noted that part 44 is generally cylindrical and is provided with an axial boss 52 at its end remote from part 46. Boss 52 intermediate of its ends is provided with a circumferential groove 54. The end of part 44 remote from boss 52 (the end adjacent part 46) is provided with a shallow, annular coaxial recess 56. Part 44 is also provided with a narrow axial bore 58 which opens at one end in the center of boss 52 and at the other end in a small boss 60 defined by the center of annular recess 56. The end surfaces of part 44 adjacent part 46, other than the surfaces forming recess 56, are coplanar and perpendicular to the axis of part 44. Part 44 is further provided with a lateral port 62 centered on a radial line relative to the axis of part 44 and extending through part 44 intermediate of its ends a distance short of bore 58. A small passageway 64 extending lengthwise in part 44 is provided interconnecting the bottom of port 62 and the bottom of recess 56.

Part 44 is further provided with a pair of blind holes 70 and 72 entering from one side intermediate of its ends which are relatively closely spaced and are positioned not to communicate with any of the recesses, ports or other passageways in part 44. Part 44 is still further provided with a bore 80 centered on a chord with respect to the axis of part 44 which intersects port 62 close to its outer end, the chord on which bore 80 is centered being tangent to the cylindrical wall of port 62.

Part 46 at its end face adjacent part 44 is provided with a conical relief 74, the apex of which is ported through a passageway 76 to a bore 78 in the opposite end of part 46. Generally the area of diaphragm 48 open to conical relief 74 in the end face of part 46 adjacent part 44 is approximately equal to the total area on the other side of diaphragm 48 adjacent to annular recess 56 and the end face area of boss 68. For reasons which will be discussed later, the area of the bottom of recess 56 should be substantially greater than the end area of boss 60 and generally is on the order of 15 to 20 times the area of the end of boss 60.

It will be noted that diaphragm 48, part 44 and part 46 all have the same diameter, that diaphragm 48 is received clamped between parts 44 and 46 and is thus secured by the annular end surface of part 46 encircling its conical relief section 74 in sealing contact against the annular end surface of part 44 which encircles recess 56 and is coplanar with the end of boss 60, such that diaphragm 48 normally is stretched over recess 56 and bore 58 preventing communication between them and divides the hollow interior of valve 22 into one space (relief 74), communicating with bore 78 and other spaces communicating with port 62 and bore 58.

In use regulator valve 22 is mounted on the side of mixer 10 which is suitably provided with cylindrical port 82 having a diameter sized to receive boss 52 such as that the bore 58 communicates with the interior of mixer 10. Desirably port 82 is provided with a small groove 84 to receive an O-ring 86. The wall of mixer 10 is further provided with a narrow opening 88 lying outwardly of groove 84, having a circular cross-section and lying on a chord with respect to the vertical axis of mixer 10 so that it intersects port 82, the chord on which it is centered being tangent to the cylindrical wall of port 82 and being positioned to register with a portion of groove 54. When valve 22 is inserted into mixer 10, compressing O-ring 86 to insure a tight seal, a pin 90 is inserted through hole 88 such that it engages the portion of groove 54 registering with hole 88 to lock valve 22 against the wall of mixer 10.

The end of hose 26 which is connected to valve 22 is terminated with a metal tube 92 which is circumferentially grooved, as indicated by the reference number 94, and which is of a diameter facilitating smooth reception of tube 92 in port 62. The position of groove 94 is such that it registers with hole 80, with the end of tube 92 clearing the bottom of port 62 to permit communication from the interior of hose 26 and tube 92 into passageway 64 and recess 56. A pin 95 extended through hole 80 is used to lock tube 92, and hence hose 26, in position by engaging the portion of groove 94 in register with hole 80. An O-ring 96 mounted in a circumferential groove 98 about the interior of port 62 inside of hole 80 is provided to insure a tight seal between tube 92 and port 62.

Flexible hose 38 is connected to valve 22 with an elbow fitting 100 which is threadedly engaged in tapped bore 78. A thermocouple and an electric resistance heater are inserted in blind holes 70 and 72, respectively, and are connected to a control circuit in a conventional manner to provide whatever degree of heat is required at valve 22 consistent with proper flow characteristics of materials through valve 22 and with desired reaction temperature to be produced in mixer 10. Component feed system 12' suitably is also connected to mixer 10 with a regulator valve 22', as indicated in FIGURE 1, in a manner similar to that described above. It should be noted that it is not necessary that every component feed system be so provided where the materials are relatively viscous and leakage through the metering pump is not normally encountered.

In operation pressure regulating valve 34, assuming feed systems 12 and 12' are charged with liquid materials to be metered to mixer 10, is adjusted to apply a suitable air or other gas pressure head on the liquid component contained in kettle 14. The same pressure is applied of course through tubing 38 to the side of diaphragm 48 facing valve part 46, and hence the gas pressure tends to hold diaphragm 48 tightly against the end of boss 60 thereby preventing communication between recess 56 and bore 58. Since the same gas pressure head is on the contents of kettle 14 as is on diaphragm 48, such head is transmitted by the liquid component in kettle 14 through hoses 24 and 26 to liquid contained in recess 56. As the area of diaphragm 48 against which such liquid pressure acts is less than the area of diaphragm 48 against which the gas head acts, the net force tends to hold diaphragm 48 against boss 60.

When it is desired to make a shot to produce a casting or to encapsulate some components or the like, control button 32 is operated which causes motor 18 to drive pump 16 to draw the liquid material from kettle 14 into the intake of pump 16, through pump 16 and to discharge such liquid component through hose 26 to recess 56 in valve 22. There is instantaneously created by such action of pump 16 a slightly higher head on the liquid in hose 26 and in recess 56 overcoming the gas head on the other side of diaphragm 48 and causing diaphragm 48 to flex into conical relief 74. The moment it does so diaphragm 48 lifts off boss 60 establishing communication between recess 56 and bore 58 and causing the liquid pressure on the discharge side of pump 16 to be exerted on the entire area of diaphragm 48. Since such liquid pressure is opposed by gas pressure in the space formed by conical relief 74, a balance of forces (and pressures) is created. Hence gas pressure acting on diaphragm 48 is effective on the discharge side of pump 16, produces a minimal pressure drop across pump 16 and thus minimizes leakage through pump 16.

When control circuit 20 causes motor 18 to stop, thereby stopping pump 16, the momentary reduction in pressure on the liquid component in hose 26 allows the gas pressure in tubing 38 to force diaphragm 48 against boss 60, much in the manner of a check valve, preventing further delivery of liquid component through valve 22 and again establishing a condition in which flow through pump 16 is prevented by reason of the slightly greater force exerted by the gas pressure against diaphragm 48 in closed position than is exerted by the liquid component in hose 26.

It will be further noted that the necessity of selecting the area of diaphragm 48 exposed by recess 56 almost as large as the area against which gas pressure is exerted dicates that the area exposed on the outlet side (bore 58) of diaphragm 48 be relatively small with the consequence that the diameter of bore 58 is small and discharge through bore 58 is at relatively high velocity. As a result in the event that mixed (setting) material in mixer 10 tends to deposit out in the end of bore 58 during periods of non-use, the danger of plug-up of bore 58 is minimized since the high velocity of discharge of materials through bore 58 will normally sweep any such hung-up material clear of bore 58.

It will be noted, moreover, that by mounting the regulator valve on the mixer the advantage of rapid disconnection of component feed system 12 from mixer 10 is readily facilitated, since pins 90 and 95 can be rapidly removed to disconnect the system completely.

Although I have described the pressure regulating valve for minimizing pressure drop across a gear pump, it will be apparent that such a valve and system as described above are readily applicable to any type of driven meter system. Although I have described the employment of a gaseous pressure medium, it will be apparent that liquid pressuring mediums can be equally employed provided adequate precaution is taken to prevent the liquid pressuring medium on the intake side of pump 16 from entering the component feed systems. Similarly, although I have described applying the pressure head onto the reservoir of the component to be metered, any mechanism which will permit the application of pressure head to the system on the intake side of the metering pump will accomplish the same ultimate objective. Indeed, where there is a long line between the component reservoir and the metering pump or where the component reservoir and pump are at a different elevation, the last method of pressure application can be preferable. Generally, however, it is desirable that there be a minimum length of conduit between the metering pump and the regulator valve in order that pressure drop in such line because of friction or change in head will be small.

I claim:

1. In an apparatus including a positive displacement pump having inlet and outlet connections thereto, said pump being operable when actuated to transfer fluid into said inlet connection and to discharge such fluid through said outlet connection: the improvement which includes a valve having a hollow valve body, an inlet passageway in said valve body providing external communication to the hollow interior of said valve body, an outlet passageway in said valve body providing external communication to the hollow interior of said valve body, and a flexible diaphragm disposed over said openings and secured to the interior structure of said valve body in sealing contact therewith through an area encircling said openings, whereby communication between said inlet and outlet passageways is prevented when said diaphragm lies against said openings and is permitted when said diaphragm is flexed away from said openings; conduit means interconnecting said outlet connection of said pump and said inlet passageway of said valve; and means for applying a pressured-fluid as a head at the inlet connection of said pump and to hold said diaphragm against said opening.

2. In a fluid metering apparatus including a positive displacement pump having inlet and outlet connections thereto and a drive means connected to said pump operable when actuated to drive said pump to transfer fluid into said pump through said inlet connection and to discharge such fluid from said pump through said outlet connection: the improvement which includes a valve having a hollow valve body, an inlet passageway in said valve body providing external communication to the hollow interior of said valve body, an outlet passageway in said valve body providing external communication to the hollow interior of said valve body, the interior ends of said passageways being adjacent and having openings into the hollow interior of said valve body which are substantially coplanar, a flexible diaphragm disposed in the common plane of said openings, positioned over said openings and secured to the interior structure of said valve body in sealing contact therewith through an area encircling said openings, whereby communication between said inlet and outlet passageways is prevented when said diaphragm lies against said openings and is permitted when said diaphragm is flexed away from said openings, and a pressured-fluid port in said valve body providing external communication to the hollow interior thereof on the side of said diaphragm away from said openings; conduit means interconnecting said outlet connection of said pump and said inlet passageway of said valve; a pressured-fluid source; means communicating said pressured-fluid source; and said inlet connection of said pump; and means communicating said pressured-fluid source with said pressured-fluid port in said valve whereby the same fluid pressure is applied as a head at the inlet connection of said pump and to hold said diaphragm against said opening.

3. The improvement according to claim 1 in which the opening of said inlet passageway is annular and disposed about the opening of said outlet passageway.

4. The improvement according to claim 1 in which the area across the opening of said inlet passageway is greater than the area across the opening of said outlet passageway.

References Cited in the file of this patent
UNITED STATES PATENTS

| | | |
|---|---|---|
| 2,564,306 | Isreeli | Aug. 14, 1951 |
| 2,747,596 | Ifield | May 29, 1956 |
| 2,837,102 | Bauer | June 3, 1958 |